(12) United States Patent
Kanazawa et al.

(10) Patent No.: US 6,620,074 B2
(45) Date of Patent: Sep. 16, 2003

(54) CENTER DIFFERENTIAL UNIT AND PLANETARY GEAR

(75) Inventors: Kazuo Kanazawa, Tokyo (JP); Hiroshi Ishihara, Akishima (JP); Shin Kurosaki, Akishima (JP); Takao Nakagawa, Warabi (JP); Hirotaka Sato, Warabi (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/132,291

(22) Filed: Apr. 26, 2002

(65) Prior Publication Data

US 2002/0160875 A1 Oct. 31, 2002

(30) Foreign Application Priority Data

Apr. 26, 2001 (JP) ........................ 2001-128994

(51) Int. Cl.$^7$ .................... F16H 48/06; F16H 57/08
(52) U.S. Cl. ................ 475/248; 475/345; 475/902; 74/DIG. 10
(58) Field of Search .............. 74/DIG. 10, 248, 74/345, 902

(56) References Cited

U.S. PATENT DOCUMENTS

| 4,651,575 A | * | 3/1987 | Morishita et al. ............. 74/7 E |
| 4,712,451 A | * | 12/1987 | Morishita et al. ............. 74/801 |
| 5,171,195 A | * | 12/1992 | Funamoto .................... 475/342 |
| 5,366,423 A | * | 11/1994 | Mori et al. .................. 475/346 |
| 5,679,089 A | * | 10/1997 | Levedahl .................... 475/332 |

FOREIGN PATENT DOCUMENTS

JP 2652715 5/1997

\* cited by examiner

*Primary Examiner*—Dirk Wright
(74) *Attorney, Agent, or Firm*—Smith, Gambrell & Russell, LLP

(57) ABSTRACT

A planetary gear type center differential unit contains a carrier, a first sun gear and a second sun gear provided interiorly of the carrier, a first and second pinions respectively meshing with the first and the second sun gears, a pinion member having a shaft-receiving hole and carrying the first pinion and the second pinion therearound, and a pinion shaft made of carbon/carbon composite. The pinion shaft is supported by the carrier at one end and is inserted into the shaft-receiving hole of the pinion member, so that the pinion shaft directly supports the pinion member so as to rotate.

14 Claims, 6 Drawing Sheets

CENTER DIFFERENTIAL UNIT AND PLANETARY GEAR

BACKGROUND OF THE INVENTION

1. Field of the Invention

The present invention relates to a center differential unit including a planetary gear, and particularly to a center differential unit containing a planetary gear used for effectively transmitting power from an engine to driving wheels of a vehicle, which can produce a sufficient differential toque and has an excellent durability.

2. Discussion of the Related Art

In a four wheel drive, power from an engine is transmitted to front and rear wheels usually by a center differential unit. In other words, power from the engine is first transmitted to a transmission by way of a clutch. The transmission output is divided by a center differential unit and transmitted to a front differential unit and a rear differential unit. Torque decelerated by the front and rear differential units is conveyed respectively to the front and rear wheels.

The center differential unit of a planetary gear type is widely used since it is relatively compact and changes in torque delivery to front and rear wheels is easily controlled.

Japanese Patent 2652715 discloses a four wheel drive with a center differential unit having a planetary gear. The center differential unit will now be explained by referring to a schematic cross section of a center differential unit shown in FIG. 5 and a schematic diagram in FIG. 6.

An output shaft 101 is connected with a rear drive shaft 102, which transmits power to a rear differential unit by way of a propeller shaft. The output shaft 101 and the rear drive shaft 102 are provided to rotate coaxially via bushings 103 and thrust bearings 104. A reduction gear 105 is supported by the output shaft 101 via the bushings 103 and rotates on the output shaft 101. The reduction gear 105 and the output shaft 101 are supported on a gearbox casing 100 by ball bearings 106. A center differential unit 110 is provided over the output shaft 101, the rear drive shaft 102 and the reduction gear 105 coaxially therewith. The reduction gear 105 meshes with a reduction gear 108 provided on a front drive shaft 107. Here, the front drive shaft 107 functions to transmit power to a front differential unit.

The center differential unit 110 includes a large diameter sun gear 111 on the output shaft 101 of a transmission on the input side, a small diameter sun gear 112 on the rear drive shaft 102 on the output side, a small diameter pinion 113 meshed with the large diameter sun gear 111, and a large diameter pinion 114 meshed with the small diameter sun gear 112. The small diameter pinion 113 and the large diameter pinion 114 are provided on a single pinion member 115.

Moreover, a supporting plate 117 for a carrier 116 is attached to the rear drive shaft 102 by way of a ball bearing 118. The supporting plate 117 and the reduction gear 105 are united as an integral body, and a pinion shaft 119 extends over the supporting plate 117 and the reduction gear 105. The pinion member 115 is supported by the pinion shaft 119 having needle bearings 120 therebetween. Both ends of the pinion member 115 are supported on the reduction gear 105 and the supporting plate 117 by a thrust washer 122 interposed therebetween. An oil supply hole 121 is perforated on the pinion shaft for supplying oil to the needle bearings 120. For the pinion shaft 119, high-carbon steel or case-hardened steel which has been subjected to a thermal treatment for hardening the surface.

In the above-mentioned center differential unit 110 containing a planetary gear of a compound type without a ring gear, differential function is attained by using the large diameter sun gear 111 and the small diameter sun gear 112 with an appropriate number of teeth. A disproportional torque ratio on the rear wheels is provided by appropriately distributing the output torque of the transmission. This is achieved by appropriately setting the distance from the meshing point of the large diameter sun gear 111 and the small diameter pinion 113 to the center of the large diameter sun gear 111, and the distance from the meshing point of the small diameter sun gear 112 and the large diameter pinion 114 to the center of the small diameter sun gear 112.

Alternatively, it is possible to use helical gears for the large diameter sun gear 111, small diameter sun gear 112, small diameter pinion 113 and large diameter pinion 114 so as to generate a thrust load. The thrust load causes friction between the edges of the thrust washer 122 and the pinion member 115. In addition, force resulting from a separation load and a tangential load is applied to the small diameter pinion 113, large diameter pinion 114 and a contacting face between the pinion member 115 and the pinion shaft 119 (needle bearings 120). Accordingly, frictional force is generated on the needle bearings 120. Thus, a differential control mechanism is provided.

In Japanese Patent 2652715, a radial load is applied to the pinion member 115 depending upon an input torque. In order to eliminate a seizure of the pinion shaft 119 with the pinion member 115, and the galling of these, the needle bearings 120 are provided as bearings for the pinion member 115. The needle bearings 120 can be replaced by bushings.

The needle bearing 120 is durable against a large load, but has a small frictional resistance, since it is a rolling bearing. On the other hand, the bushings contact with the pinion member 115 by sliding therebetween. Therefore, the bushing has a large frictional resistance, but a seizure will occur when lubricating oil is in sufficiently supplied. Accordingly, it is difficult to take an appropriate countermeasure when large torque for reducing differential action is required based on a load when traveling for instance on a muddy road or a road with a bad surface condition.

Usually, metal materials are employed for the pinion member 115 and the pinion shaft 119 in order to attain a sufficient strength. When large torque for reducing differential action is necessary, it is possible to increase friction between the pinion member 115 and the pinion shaft 119 by supporting the pinion member directly on the pinion shaft 119 without providing the needle bearing 120 or the bushing. In this case, however, it is impossible for the pinion shaft 119 and the pinion member to endure such a large stress, which causes seizure. Alternatively, if forced lubrication is carried out so as to prevent the seizure, the frictional resistance between the pinion shaft 119 and the pinion member 115 is decreased.

In order to obtain sufficient friction, it is effective to use a paper material, which is usually used as a friction material for a multi-plate clutch for an automatic transmission, by interposing the paper material between the pinion shaft 119 and the pinion member 115. However, the paper material is not suitable for practical use when lubricating oil containing an additive of a mineral material is used for the differential gear. This is because the durability of the paper friction material is largely decreased due to absorption of such oil.

In this way, it is difficult to obtain both sufficient friction and torque for reducing differential action.

OBJECT AND SUMMARY OF THE INVENTION

It is therefore a first object of the present invention to provide a center differential unit of a planetary gear type which provides torque for reducing differential action corresponding to an input torque in addition to maintaining a stable function of a planetary gear contained therein by obtaining a sufficient frictional force between a pinion shaft and a pinion member without interposing a bearing or a bushing therebetween and efficiently eliminating a seizure therebetween, comprising a carrier; a first sun gear for receiving an output from a transmission and positioned interiorly of the carrier; a second sun gear provided on an output side with respect to the first sun gear and positioned interiorly of the carrier; a first pinion meshing with the first sun gear; a second pinion meshing with the second sun gear; a pinion member carrying the first pinion and the second pinion therearound, the pinion member having a shaft-receiving hole; and a pinion shaft having at least a surface of carbon/carbon composite, the pinion shaft supported by the carrier at one end on the output side and directly supporting the pinion member so as to rotate by being inserted into the shaft-receiving hole of the pinion member.

The first object of the present invention can also be achieved by the center differential unit of the planetary gear type, wherein the pinion shaft is made entirely of carbon/carbon composite.

A second object of the present invention is to provide the center differential unit which provides torque for reducing differential action with an improved reliability with efficiently maintaining a sufficient frictional force between the pinion shaft and the pinion member contained in the planetary gear, wherein force resulting from a separation load and a tangential load generated at a meshing point of the first sun gear and the first pinion and a meshing point of the second sun gear and the second pinion is applied to the pinion shaft.

A third object of the present invention is to provide the center differential unit which provides a larger quantity of torque for reducing the differential action, wherein the first sun gear, the second sun gear, the first pinion and the second pinion are helical gears, a thrust load generated at a meshing point of the first sun gear and the first pinion, and a thrust load generated at a meshing point of the second sun gear and the second pinion cause frictional force between the second sun gear and the carrier.

A fourth object of the present invention is to provide a center differential unit of a planetary type which provides torque for reducing differential action corresponding to an input torque with maintaining a stable function of a planetary gear contained therein and a sufficient frictional force between a pinion shaft and a pinion member without further providing a bearing or a bushing as a separate member therebetween and by efficiently eliminating a seizure therebetween, comprising a carrier; a first sun gear for receiving a output from a transmission and positioned interiorly of the carrier; a second sun gear provided on an output side with respect to the first sun gear and positioned interiorly of the carrier; a first pinion meshing with the first sun gear; a second pinion meshing with the second sun gear; a pinion member carrying the first pinion and the second pinion therearound, the pinion member having a shaft-receiving hole; a bearing made of carbon/carbon composite provided in the shaft-receiving hole; and a pinion shaft made of a steel material, the pinion shaft supported by the carrier at one end on the output side and directly supporting the pinion member so as to rotate by being inserted into the shaft-receiving hole of the pinion member.

A fifth object of the present invention is to provide the center differential unit which provides torque for reducing differential action with an improved reliability with efficiently maintaining a sufficient frictional force between the pinion shaft and the pinion member contained in the planetary gear, wherein force resulting from a separation load and a tangential load generated at a meshing point of the first sun gear and the first pinion and a meshing point of the second sun gear and the second pinion is applied to the pinion shaft.

A sixth object of the present invention is to provide the center differential unit which provides larger quantity of torque for reducing differential action wherein the first sun gear, the second sun gear, the first pinion and the second pinion are helical gears, a thrust load generated at a meshing point of the first sun gear and the first pinion, and a thrust load generated at a meshing point of the second sun gear and the second pinion cause frictional force between the second sun gear and the carrier.

A seventh object of the present invention is to provide the center differential unit containing a planetary gear having a smaller member, wherein the carbon/carbon composite has a bending strength in the range of 200 MPa to 1200 MPa, a compressive strength in the range of 100 MPa to 800 MPa, and an interlaminar shear strength in the range of 20 MPa to 600 MPa.

A eighth object of the present invention is to provide a planetary gear which functions in a stable manner and is light in weight and simple in structure by having a sufficient frictional force between a pinion shaft and a pinion member without providing a bearing or a bushing therebetween and efficiently eliminating a seizure therebetween, comprising a carrier; a sun gear provided interiorly of the carrier; a pinion meshing with the sun gear; a pinion member carrying the pinion therearound, the pinion member having a shaft-receiving hole; and a pinion shaft having at least a surface of carbon/carbon composite, the pinion shaft supported by the carrier and directly supporting the pinion member so as to rotate by being inserted into the shaft-receiving hole of the pinion member.

The eighth object of the present invention can also be achieved by the planetary gear wherein the pinion shaft is made entirely of carbon/carbon composite.

An ninth object of the present invention is to provides a planetary gear which is light in weight and simple in structure by maintaining a sufficient frictional force between a pinion shaft and a pinion member without further providing a bearing or a bushing as a separate member therebetween and efficiently eliminating a seizure therebetween, comprising a carrier; a sun gear provided interiorly of the carrier; a pinion meshing with the sun gear; a pinion member carrying the pinion therearound, the pinion member having a shaft-receiving hole; a bearing made of carbon/carbon composite provided in the shaft-receiving hole; and a pinion shaft made of a steel material, the pinion shaft supported by the carrier and directly supporting the pinion member so as to rotate by being inserted into the shaft-receiving hole of the pinion member.

A tenth object of the present invention is to provide the planetary gear having a smaller member, wherein the carbon/carbon composite has a bending strength in the range of 200 MPa to 1200 MPa, a compressive strength in the range of 100 MPa to 800 MPa, and an interlaminar shear strength in the range of 20 MPa to 600 MPa.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

A first embodiment of a center differential unit containing a planetary gear of the present invention will be explained by referring to figures.

(First Embodiment)

In the first embodiment, a manual transmission is used.

Figure 1:
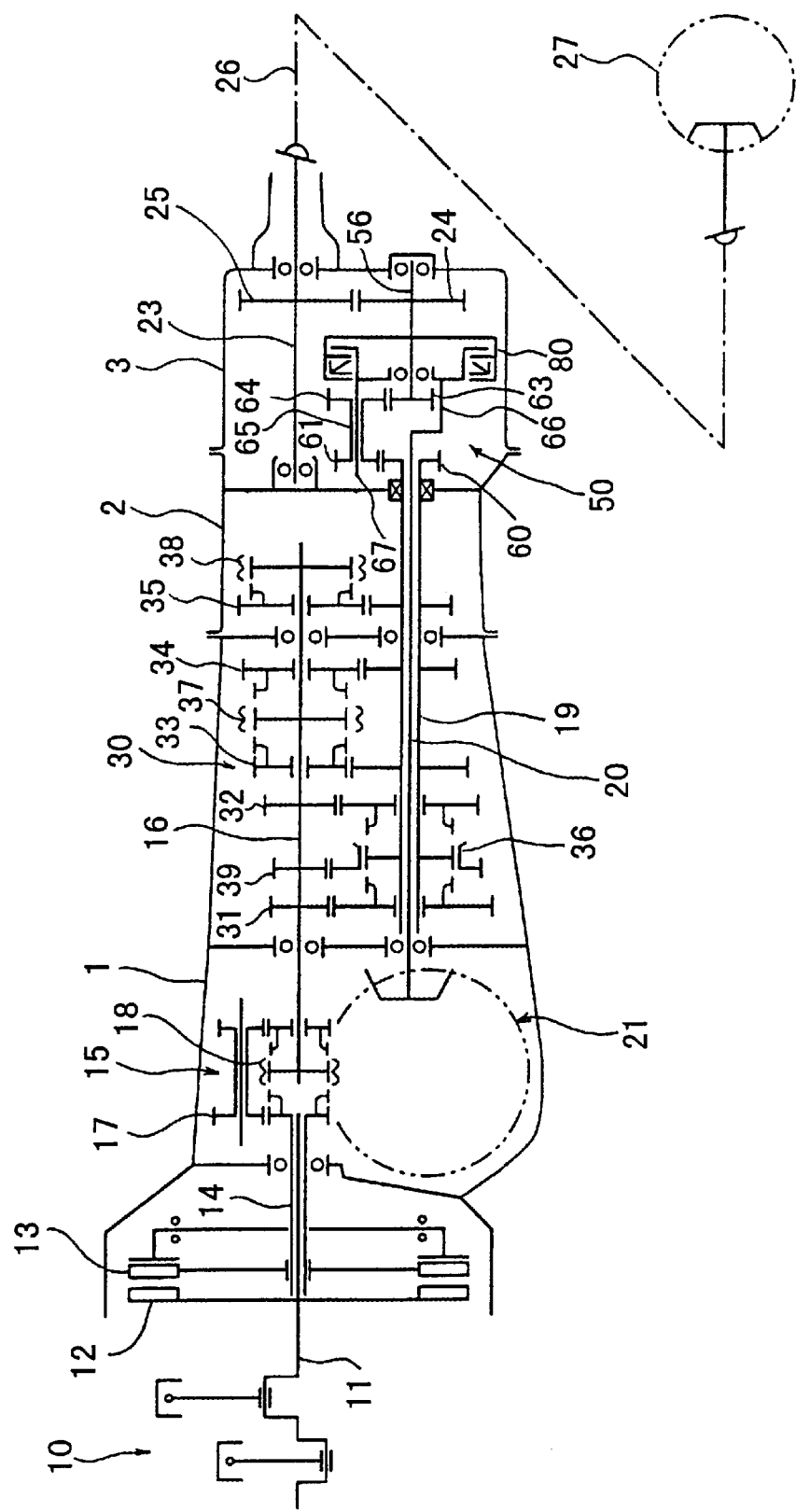
FIG. 1 is a schematic diagram of a transmission for showing a first embodiment of a center differential unit containing a planetary gear of the present invention.
Figure 2:
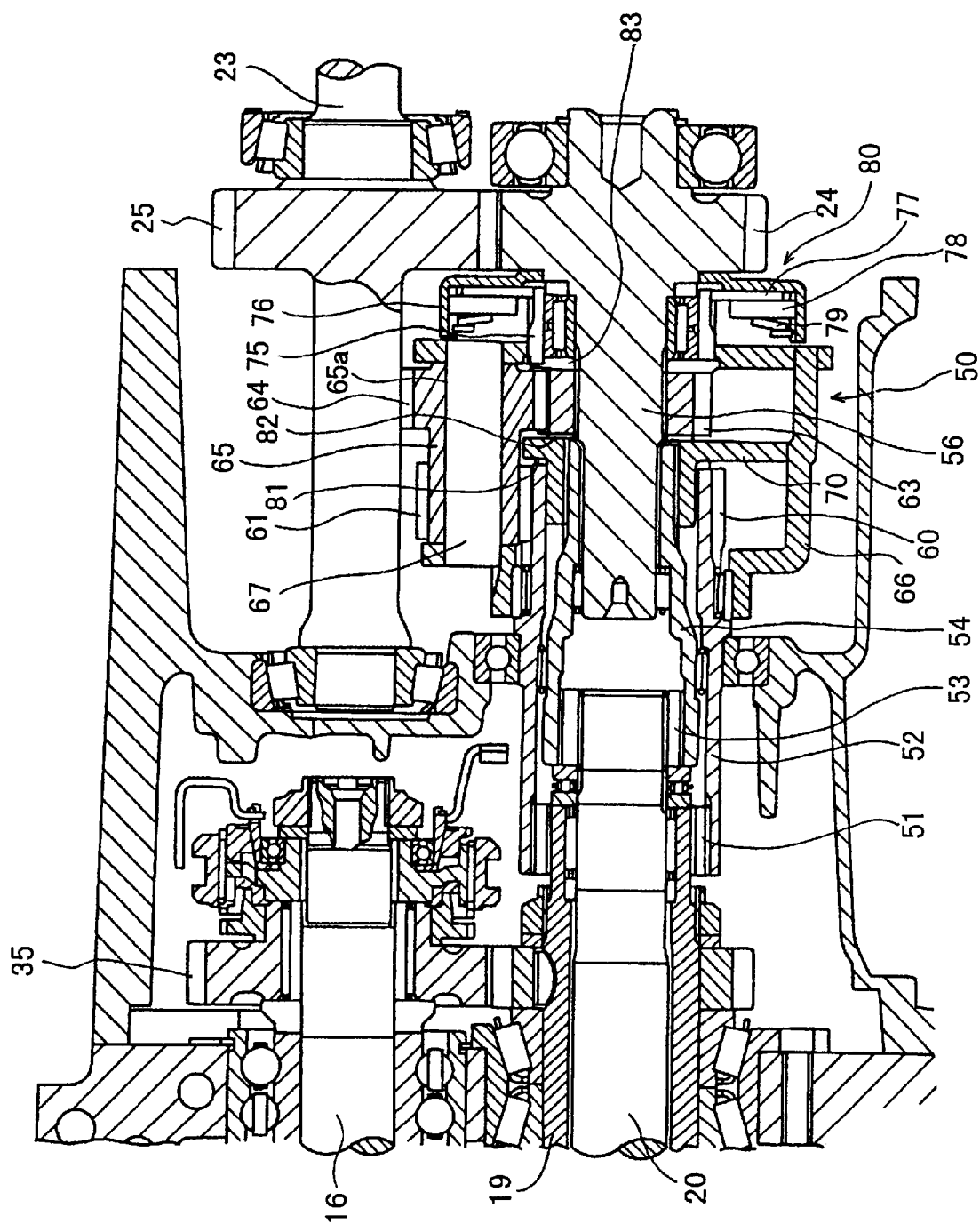
FIG. 2 is a schematic cross section of a center differential unit.
Figure 3:
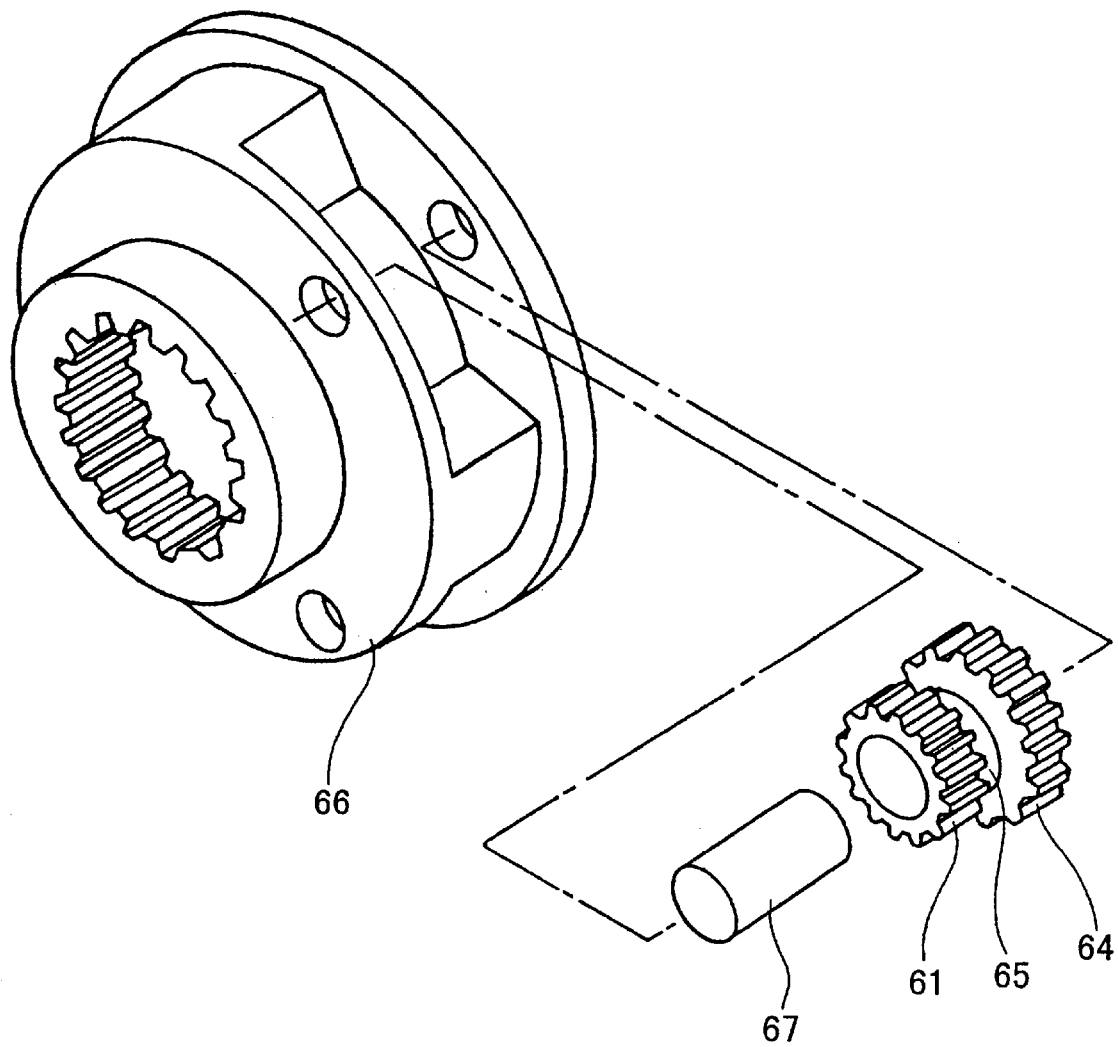
FIG. 3 is a schematic perspective view of a center differential unit.

FIG. 1 is a schematic diagram of the transmission; FIG. 2 is a schematic cross section of a center differential unit; and FIG. 3 is a perspective view of the center differential unit.

FIG. 1 shows that a transmission casing 1, a transfer casing 2 and an extension casing 3 are connected. An engine 10 has a crank shaft 11 connected to a clutch 13 via a flywheel 12, and an intermediate shaft 14 extends from the clutch 13 to a sub-transmission 15.

In the sub-transmission 15, a constant mesh type counter gear mechanism 17, and a synchronizing mechanism 18 are provided between the intermediate shaft 14 and an input shaft 16. By this structure, high and low speed switching is performed. The input shaft 16 extends into a manual transmission 30. An output shaft 19 of the manual transmission 30 is provided in parallel with the input shaft 16. The input shaft 16 is led into a center differential unit 50 contained in the extension casing 3. The output shaft 19 has a cylindrical shape, and a front drive shaft 20 contains the output shaft 19. The center differential unit 50 is connected with a front differential unit 21 provided in the sub-transmission 15 at a bottom part thereof by way of the center differential unit 50. Torque is conveyed from the front differential unit 21 to front wheels.

A rear drive shaft 23 is arranged in the extension casing 3 at the same height as the input shaft 16 in the manual transmission 30. A rear output shaft 56 and the rear drive shaft 23 are linked with each other by way of a pair of transfer gears 24, 25. Torque from the rear drive shaft 23 is transmitted to a propeller shaft 26, a rear differential unit 27 and rear wheels.

The manual transmission 30 is a constant mesh type, and a first gear train 31, a second gear train 32, a third gear train 33, a fourth gear train 34, a fifth gear train 35, and synchronizing mechanisms 36, 37 and 38 are arranged over the input shaft 16 and the output shaft 19 provided in parallel with each other. Further, a reverse gear train 39 is positioned between the first gear train 31 and the second gear train 32. By selectively operating the synchronizing mechanisms 36, 37 and 38, the first to the fifth speed are selected. The reverse gear train 39 provides reverse drive.

As shown in FIG. 2, the output shaft 19 extends into the center differential unit 50. The center differential unit 50 contains a center differential input shaft 52, a front output shaft 54 and a rear output shaft 56. The center differential input shaft 52 has a cylindrical shape and one end of the center differential input shaft 52 covers an outer surface of the output shaft 19 at an end by a spline connection through an intermediate member 51. The front output shaft 54 also has a cylindrical shape and is contained in the hollow portion of the center differential input shaft 52. One end of the front output shaft 54 is connected with the front drive shaft 20 so as to cover an end outer surface of the front drive shaft 20 by a spline connection having an intermediate member therebetween. Furthermore, the front output shaft 54 contains therein a top portion of the rear output shaft 56. The center differential input shaft 52, the front output shaft 54 and the rear output shaft 56 coaxially rotate on each other.

A large diameter sun gear 60 is provided at a base end of the center differential input shaft 52 as an integral body. A small diameter pinion 61 is in mesh with the large diameter sun gear 60. On the other hand, a small diameter sun gear 63 is linked with the rear output shaft 56 by a spline connection so as to be provided at an intermediate part of the output shaft 56. A large diameter pinion 64 is in mesh with the small diameter sun gear 63.

The small diameter pinion 61 and the large diameter pinion 64 are formed integrally with a hollow pinion member 65 which has a hole 65a for receiving a pinion shaft 67. Thus, the first and large diameter pinions 61 and 64 are supported on the pinion shaft 67 fixed to a carrier 66.

The center differential input shaft 52 is inserted from the front to the carrier 66, and the rear output shaft 56 is inserted from the back so as to rotate. The carrier 66 contains the large diameter sun gear 60 and the small diameter sun gear 63 at an intermediate space as shown in FIG. 3. A planetary gear is structured by the provision of the pinion shaft 67 with the small diameter pinion 61 meshed with the large diameter sun gear 60 and the large diameter pinion 64 with the small diameter sun gear 63.

In the present invention, a carbon/carbon composite (hereinafter referred to as C/C composite) is used for the pinion shaft 67. The C/C composite is a material prepared by impregnating carbon fibers, carbon textile or carbon filament/yarn with a thermosetting resin or a thermoplastic resin to obtain an impregnated material, followed by calcinating the impregnated material at a high temperature under a high pressure. Namely, the C/C composite is prepared by reinforcing a carbon matrix with carbon fibers. The thus obtained graphited C/C composite is used for the pinion shaft 67.

The conventional C/C composite has a bending strength of less than 200 MPa. In the present invention, it is preferable to use C/C composite having a bending strength in the range of 200 MPa to 1200 MPa, a compressive strength in the range of 100 MPa to 800 MPa, and an interlaminar shear strength in the range of 20 MPa to 600 MPa.

When the C/C composite has the excellent mechanical strengths in the above range, it is possible to obtain a smaller member for the planetary gear, which is preferable for the industrial use.

The C/C composite is light and has an excellent thermal resistance, pressure resistance and abrasion resistance. Moreover, the C/C composite has a coefficient of friction which is appropriate for sliding contact with other members, and self-lubricating properties due to action of the carbon content as a lubricant.

Therefore, it is possible to provide the pinion shaft 67 which is light in weight and has satisfactory friction contact with the pinion member 65 when in sliding contact therewith. Furthermore, it is possible to eliminate or minimize the seizure or undesired abrasion of the pinion shaft 67 with the pinion member 65 by use of the pinion shaft made of the C/C composite even when other lubrication cannot be sufficiently performed. The C/C composite is a porous material, thereby having excellent permeability and retention when lubricating oil is added to the C/C composite.

The small diameter pinion 61 and the large diameter pinion 64 are spaced from each other on the pinion shaft 67 and are arranged at an internal part of the carrier 66. The carrier 66 has a hub 70 on the internal surface. The hub 70 extends from a gap between the large diameter sun gear 60 and the small diameter sun gear 63 to the inside of the center differential input shaft 52 and is linked with the outer surface of the front output shaft 54 by the spline connection. By this configuration, power transmitted to the carrier 66 via the pinion shaft 67 is transmitted to the hub 70, the front output shaft 54 and the front drive shaft 20. On the other hand, power transmitted to the rear output shaft 56 by way of the small diameter sun gear 63 is transmitted to the rear drive shaft 23 via transfer gears 24 and 25.

At the back side of the carrier 66, a cylindrical clutch hub 75 is supported by the rear output shaft 56 via a thrust bearing so as to rotate around the rear output shaft 56. A clutch drum 76 is fixed on the rear output shaft 56 and faces the clutch hub 75. A drive plate 77, a driven plate 78, and a cone disc spring 79 are provided between the clutch hub 75 and the clutch drum 76. The clutch hub 75, the clutch drum 76, the drive plate 77, the driven plate 78, and the cone disc spring 79 constitute an initial torque generating unit 80. The initial torque generating unit 80 is for generating a predetermined quantity of torque for limiting differential action (herein after referred to as "differential limiting torque") based on torque between the carrier 66 and the rear output shaft 56, that is, differential rotation between the front and rear wheels. The initial torque can be determined by appropriately selecting the pressing force created by the cone disc spring 79.

The center differential unit 50 can be controlled to appropriately distribute a reference torque, for instance to provide a suitable disproportional torque distribution by providing a larger torque for the rear wheels. This control is made by properly setting the distance from the meshing point of the large diameter sun gear 60 and the small diameter pinion 61 to the center of the large diameter sun gear 60, and the distance from the meshing point of the small diameter sun gear 63 and the large diameter pinion 64 to the center of the small diameter sun gear 63.

A first friction washer 81, a second friction washer 82, and a third friction washer 83 are interposed respectively between the large diameter sun gear 60 and the hub 70, between the hub 70 and the small diameter sun gear 63 and between the small diameter sun gear 63 and the carrier 66. A differential control mechanism of the center differential unit 50 is obtained by the frictional force generated by the friction washers 81, 82 and 83, and that generated between the pinion shaft 67 and the hole 65a of the pinion member 65 for receiving a pinion shaft 67.

In this embodiment, it is preferable to use helical gears for the large diameter sun gear 60, small diameter pinion 61, small diameter sun gear 63 and large pinion 64. The threads of the helical gears are so structured that the small diameter pinion 61 applies a thrust load to urge the large diameter sun gear 60 to the rear side, i.e., to the hub side, and that the large diameter pinion 64 applies a thrust load to urge the small diameter sun gear 63 to the front side, i.e., to the hub side when the vehicle goes forward.

In the case where the vehicle goes forward, the first friction washer 81 and the second friction washer 82 are pressed to the hub 70 by the large diameter sun gear 60 and the small diameter sun gear 63 to generate frictional force. In the case where the vehicle goes back, the thrust load of the small diameter sun gear works in a reversed direction, so that the third friction washer 83 is pressed to the carrier 66 by the large diameter sun gear 63 to give frictional force.

Force results from a separation load and a tangential load on the meshing point of the large diameter sun gear 60 and the small diameter pinion 61, and on the meshing point of the small diameter sun gear 63 and the large diameter pinion 64 can be applied to a supporting part between the pinion shaft 67 and the small diameter pinion 61/large diameter pinion 63. Namely, the force is applied to the part between the pinion member 65 and the pinion shaft 67, whereby friction is obtained therebetween.

The thus obtained frictional force between the pinion member 65 and the pinion shaft 67 works as frictional torque in a reversed direction with respect to the rotation of the pinion member 65, namely, as torque for reducing the differential. Thus, the structure with the helical gears is effective to generate torque for restricting the differential depending upon the input force.

Depending upon the difference of the rotation number of front wheels from that of rear wheels, the rotating directions of the pinions are changed. In this case, the functioning manner of the differential limiting torque also varies. In operation, differential action brought about by the function of differential limiting torque is automatically modified, when the vehicle turns under the situation where the rotation number of the front wheels is larger than that of the rear wheels, when the front wheels slip, and when the rear wheels slip under the situation where the rotation number of the front wheels is less than that of the rear wheels.

The function of the center differential unit 50 will be explained in detail.

When the clutch 13 is disengaged and gears are engaged for running forward while stopping or traveling, the synchronizing mechanism 36, 37 or 38 is engaged with one of the first to fifth gear trains 31 to 35 (FIG. 1). The selected gear train synchronizes with the input shaft 16. In this state, by letting the clutch 13 in, power from the engine 10 is input to the input shaft 16 of the manual transmission 30 via the sub-transmission 15. The power varied by the selected transmission gear train is transmitted to the output shaft 19. When the clutch 13 is disengaged and the reverse gear train 36 is engaged, power in a reversed direction is output to the output shaft 19. In this way, 5 gearing states for forward movement and one gearing stage for backward movement are selected.

Power transmitted to the output shaft 19 is input into the large diameter sun gear 60 by way of the center differential input shaft 52 in the center differential unit 50. Output from the large diameter sun gear 60 is transmitted to the pinion member 65 via the small diameter pinion 61.

When the vehicle goes forward, the center differential unit 50 distributes torque to the front and rear wheels depending on the conditions of the gears. The power transmitted from the carrier 66 is transmitted to the front wheels by way of the hub 70, the front output shaft 54, the front drive shaft 20, and the front differential unit 21. On the other hand, power transmitted via the large diameter sun gear 63 is transmitted to the rear output shaft 56, the transfer gears 24 and 25, the rear drive shaft 23, the propeller shaft 26 and the rear differential unit 27.

For torque transmission, initial torque is generated by the force of the cone disc spring 79 pressing the drive plate 77 and the driven plate 78 in the initial torque generating unit 80, which is designed to produce a predetermined initial torque. The initial torque is applied to a portion between the carrier 66 and the rear output shaft 56.

By the differential relation between the front and rear wheels, a thrust load is generated corresponding to the input torque. The thrust load obtained by the small diameter pinion 61 urging the large diameter sun gear 60 backward and the large diameter pinion 64 urging the small diameter sun gear 63 forward. Then, frictional force is generated between the large diameter sun gear 60 and the hub 70, and between the small diameter sun gear 63 and the hub 70 by way of the first and second friction washers 81 and 82.

The force, which is resulted from a separation load and a tangential load on the meshing point of the large diameter sun gear 60 and the small diameter pinion 61, and on the meshing point of the small diameter sun gear 63 and the large diameter pinion 64, is applied to the portion between the pinion member 65 and the pinion shaft 67 depending on the input torque value, whereby friction is obtained therebetween. The friction works as frictional torque in a reversed direction against the differential rotation of the pinion member 65. In other words, the friction is obtained as differential limiting torque, whereby a performance of the vehicle to run on a rough road surface, and driving stability are obtained.

For going backward, a thrust load on the small diameter sun gear 63 is obtained in a reversed direction by the differential rotation between the front and rear wheels, and the small diameter sun gear 63 presses the third friction washer 83 to the carrier 66, thereby giving frictional force. Furthermore, the force which is resulted from a separation load and a tangential load on the meshing point of the large diameter sun gear 60 and the small diameter pinion 61, and on the meshing point of the small sun gear 63 and the large diameter pinion 64, is applied to the portion between the pinion member 65 and the pinion shaft 67. Accordingly, friction is obtained between the pinion member 65 and the pinion shaft 67. The friction works as frictional torque in a reversed direction against the rotation of the pinion member 65. In other words, the friction is obtained as the differential limiting torque, whereby an excellent performance of the vehicle to run on a rough road surface, and driving stability are obtained.

Since the pinion shaft 67 is made of C/C composite which has a sufficient coefficient of friction, it is possible to directly support the pinion member 65 around the pinion shaft 67. The pinion member is supported by directly bearing when the pinion shaft 67 is brought into contact with other members by sliding therewith. Therefore, it is possible to maintain a satisfactory frictional force between the pinion shaft 67 and the pinion member 65.

As a result, the seizure between the pinion shaft 67 and the pinion member 65 can be effectively prevented, and necessary differential limiting torque can be obtained. Namely, the ability of the vehicle to run a long distance or to run on a bad road, and the driving stability are obtained.

In addition to the above, the pinion shaft 67 of the present invention has self-lubricating properties due to the C/C composite when in sliding contact with other members. Further, the pinion shaft 67 has excellent permeability and retention, and stable lubricating properties, when lubricating oil is added to the porous C/C composite.

Therefore, the planetary gear and the center differential unit containing the planetary gear has sufficient durability and can be used for a long period time in a stable condition since the seizure or undesired abrasion of the pinion shaft 67 and the pinion member 56 is eliminated. Simultaneously, a sufficient friction between the pinion member 65 and the pinion shaft 68 is obtained. Furthermore, it is possible to use oil for a manual transmission as a lubricant, that is convenient for practical use.

The weight of the pinion shaft 67 made of C/C composite is largely reduced in comparison with conventional pinion shafts made of metal materials. It is possible to support the pinion member 65 directly by the pinion shaft 67 without using a needle bearing or a bushing. Consequently, there are such advantages that the number of the members is reduced, the shape/structure of the pinion shaft 67 is simple without having a lubricating-oil supply hole, assembling work is easy, and the manufacturing cost is largely reduced.

It is also possible to prepare the pinion shaft 67 with a cylindrical C/C composite containing a steel core material as an integral structure.

(Second Embodiment)

Figure 4:
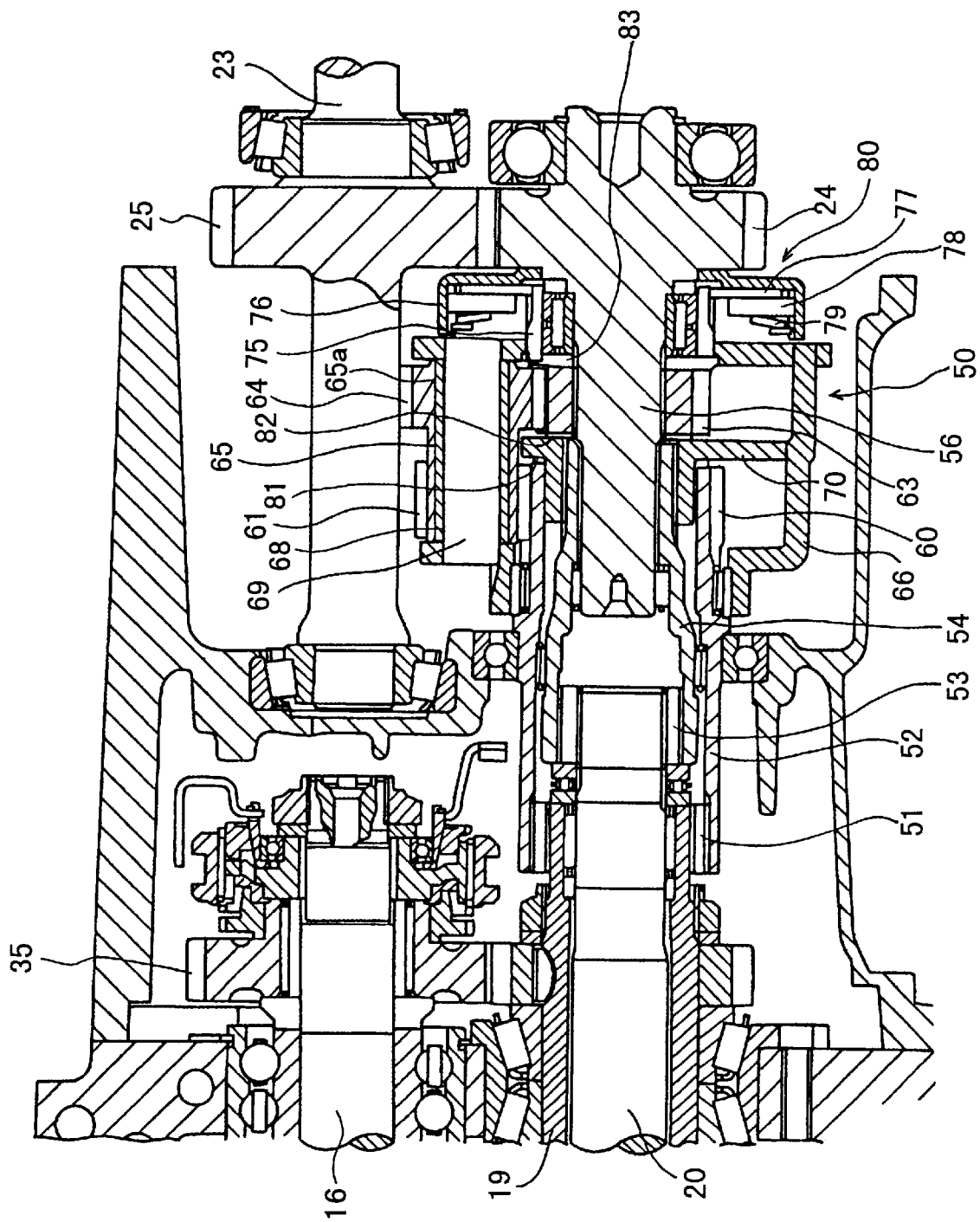
FIG. 4 is a schematic cross section of a transmission showing a second embodiment of a center differential unit containing a planetary gear of the present invention.
Figure 5:
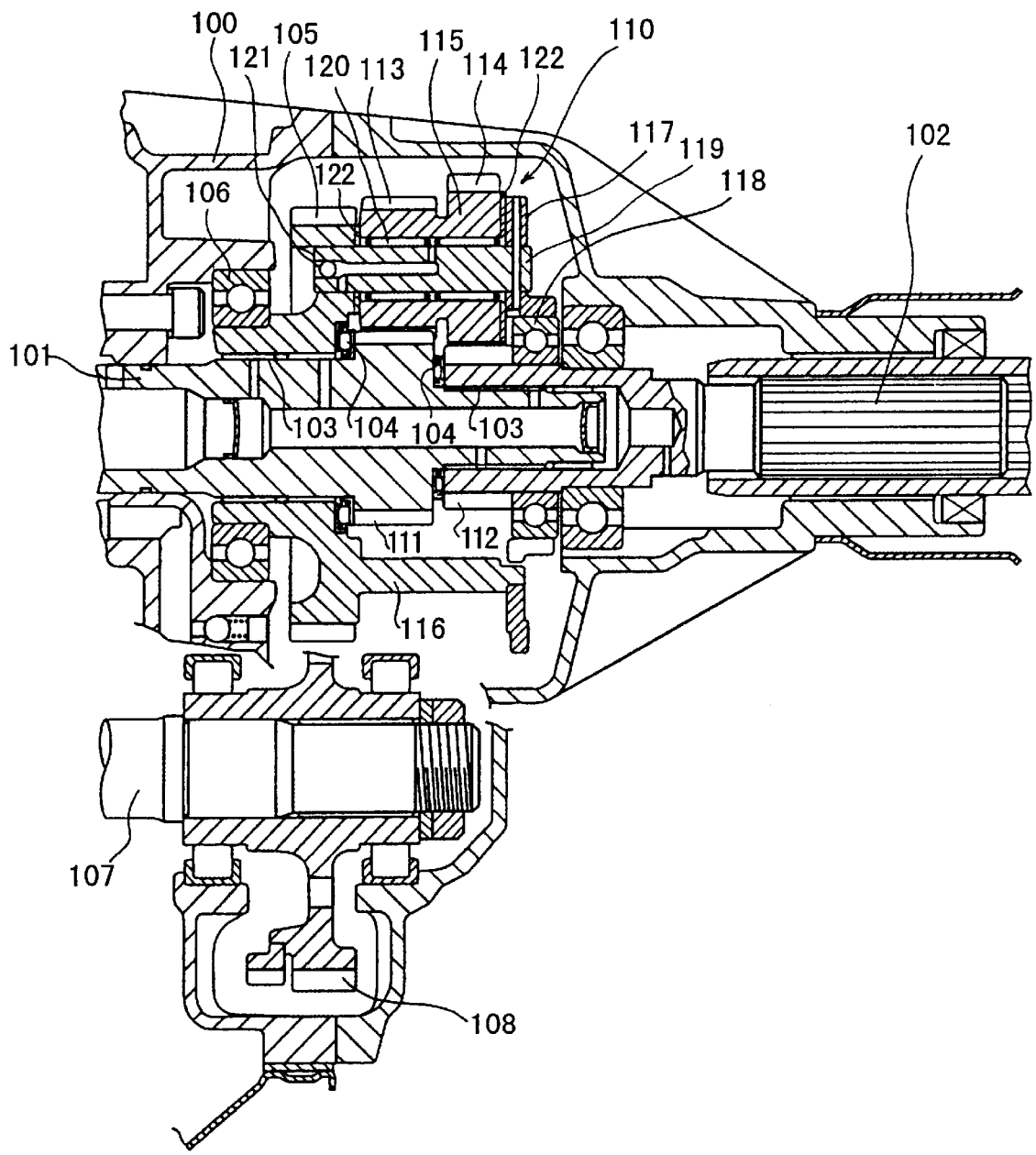
FIG. 5 is a schematic cross section of a transmission showing a conventional center differential unit.
Figure 6:
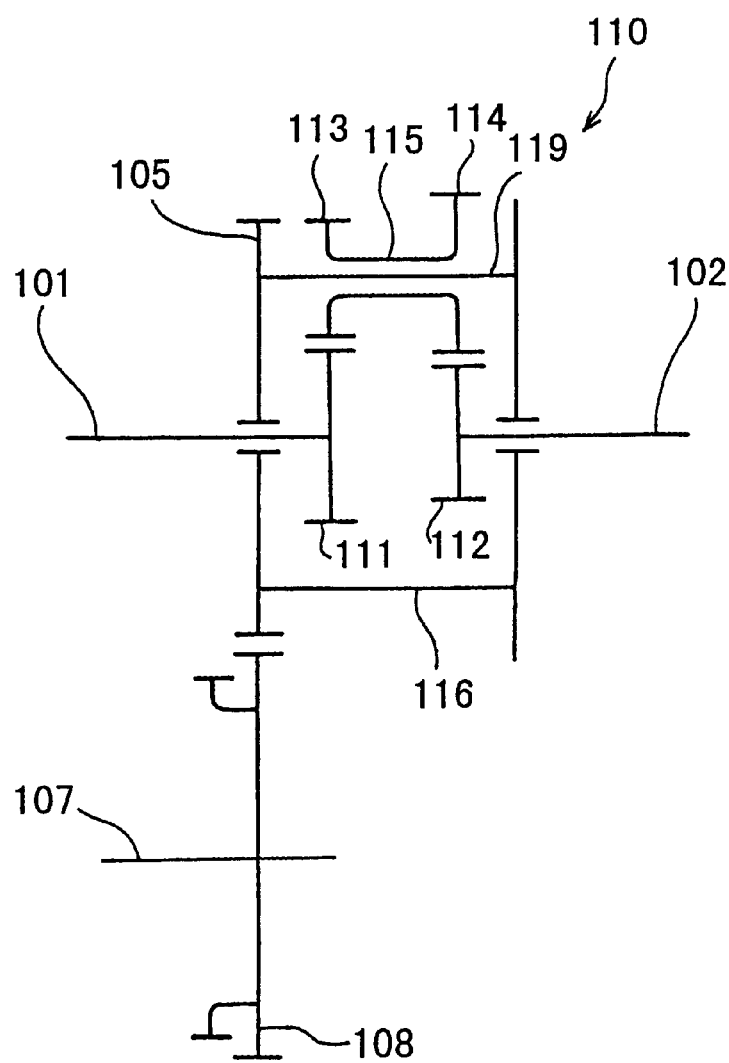
FIG. 6 is a schematic diagram of the center differential unit shown in FIG. 5.

A second embodiment of the present invention will be explained by referring to FIG. 4. In FIG. 4, members corresponding to those in FIG. 2 are indicated by the same reference numerals, and the detailed explanations on these common members are omitted.

The pinion member 65 is formed as an integral body with the small diameter pinion 61 and the large diameter pinion 64. The pinion member 65 has the hole 65*a* for receiving a pinion shaft 69. Inside the hole 65*a*, a cylindrical bearing 68 made of the C/C composite is provided on the inner face of the shaft-receiving hole 65*a* as an integral structure. The pinion shaft 69 is made of a steel material and fixed to the carrier 66 by inserting the pinion shaft 69 in the bearing 68 with both ends fixed to the carrier 66. The bearing 68 used for the present invention is integral with the pinion member 65. The pinion member 65 is directly supported by the pinion shaft 69 without having needle bearings or bearings of any other separate types therebetween. By using the C/C composite for the bearing 68, the weight of the pinion member 65 is decreased, and the bearing 68 and the pinion shaft 69 which slide on each other produce sufficient friction. Even when other lubrication cannot be sufficiently performed, it is possible to eliminate or minimize the seizure or undesired abrasion of the pinion shaft 69 with the pinion member 65.

The center differential unit 50 distributes torque to the front and rear wheels depending on the conditions of the gears when the vehicle goes forward. The power transmitted from the carrier 66 is transmitted to the front wheels by the hub 70, the front output shaft 54, the front drive shaft 20, and the front differential unit 21. On the other hand, the power transmitted via the large sun gear 63 is transmitted to the rear output shaft 56, the transfer gears 24 and 25, the rear drive shaft 23, the propeller shaft 26 and the rear differential unit 27.

For torque transmission, initial torque is generated by the force of the cone disc spring 79 pressing the drive plate 77 and the driven plate 78 in the initial torque generating unit 80, which is designed to produce a predetermined initial torque. The initial torque is applied to the portion between the carrier 66 and the rear output shaft 56.

A thrust load is generated corresponding to the input torque by the differential relation between the front and rear wheels. The thrust load is obtained by the small diameter pinion 61 urging the large diameter sun gear 60 backward and the large diameter pinion 64 urging the small diameter sun gear 63 forward. Then, frictional force is generated between the large diameter sun gear 60 and the hub 70, and between the small diameter sun gear 63 and the hub 70 by way of the first and second friction washers 81 and 82.

The force, which is resulted from a separation load and a tangential load on the meshing point of the large diameter sun gear 60 and the small diameter pinion 61, and on the meshing point of the small diameter sun gear 63 and the large diameter pinion 64, is applied to the small diameter pinion 61, the large diameter pinion 64 and the pinion shaft 69. Therefore, the frictional force generates at a portion between the bearing 68 and the pinion shaft 69. The friction works as differential limiting torque, whereby the performance of the vehicle to run on a bad road, and the driving stability are obtained.

For going backward, a thrust load on the small diameter sun gear 63 is obtained in a reversed direction by the differential rotation between the front and rear wheels, and the small diameter sun gear 63 presses the third friction washer 83 to the carrier 66, thereby giving frictional force. Furthermore, the force which is resulted from a separation load and a tangential load on the meshing point of the large diameter sun gear 60 and the small diameter pinion 61, and on the meshing point of the small diameter sun gear 63 and the large diameter pinion 64, is applied to the portion between the bearing 68 and the pinion shaft 69. Accordingly, friction between the bearing 68 and the pinion shaft 69 works as frictional torque in a reversed direction against the rotation of the pinion member 65. In other words, the friction is obtained as the differential limiting torque, whereby the performance of the vehicle to run on a bad road, and driving stability are obtained.

Since the pinion shaft 69 is made of a steel material and the bearing 68 which is integral with the pinion member 65 is made of C/C composite, the pinion shaft 69 is supported by the pinion member 65 with maintaining a sufficient frictional force therebetween.

As a result, the seizure between the pinion shaft 69 and the bearing 68 can be effectively prevented, and necessary differential limiting torque can be obtained. Namely, the ability of the vehicle to run on the rough road surface, and the driving stability are obtained. Moreover, it is possible to eliminate the seizure or undesired abrasion of the pinion shaft 69 with the bearing 68 because of the stable lubricating properties. Therefore, the durability of the members are obtained, and hence the planetary gear and the center differential unit 50 containing the same can be used in a stable condition for a long period of time.

As previously mentioned, the pinion shaft 69 directly supports the pinion member 65 containing the bearing 68 without interposing a needle bearing therebetween. Therefore, the number of the structural members is decreased and the pinion shaft 69 has a simple structure without necessity to have a lubricating oil supply hole. Due to the simple structure, the assembling is simplified and a large manufacturing cost reduction can be attained.

The central transmission unit and the planetary gear according to the present invention are also applicable to an automatic transmission. Further, it is possible that the output from the second sun gear is transmitted to the front differential unit and the output from the carrier is transmitted to the rear differential unit. The planetary gear of the invention can be widely used for other devises than the center differential unit.

As clearly understood from the above, the planetary gear of the present invention or the planetary gear contained in the center differential unit of the present invention has a pinion shaft made of C/C composite at least on the surface, or the pinion member which is integral with a bearing made of C/C composite for supporting a pinion shaft made of a steel material. According to this structure, it is possible to obtain a sufficient friction between the pinion shaft and the pinion member or the pinion shaft and the bearing provided on the pinion member with maintaining differential limiting torque. Simultaneously, it is possible for the planetary gear or the center differential unit to have stable properties by eliminating the seizure of the pinion shaft with the pinion member.

In the present invention, a needle bearing or bushing as a separate member is not necessary of supporting a pinion member on a pinion shaft. Therefore, it is possible to reduce the number of members to be used. The structure of the planetary gear is simplified, and the manufacturing cost is largely reduced.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A center differential unit of a planetary gear type comprising:

a carrier;

a first sun gear for receiving an output from a transmission and positioned interiorly of said carrier;

a second sun gear provided on an output side with respect to said first sun gear and positioned interiorly of said carrier;

a first pinion meshing with said first sun gear;

a second pinion meshing with said second sun gear;

a pinion member carrying said first pinion and said second pinion therearound, said pinion member having a shaft-receiving hole; and a pinion shaft having at least a surface of carbon/carbon composite, said pinion shaft supported by said carrier at one end on the output side and directly supporting said pinion member so as to rotate by being inserted into said shaft-receiving hole.

2. The center differential unit of a planetary gear type as claimed in claim 1, wherein said pinion shaft is made entirely of carbon/carbon composite.

3. The center differential unit of a planetary gear type as claimed in claim 1, wherein force resulting from a separation load and a tangential load generated at a meshing point of said first sun gear and said first pinion and a meshing point of said second sun gear and said second pinion is applied to said pinion shaft.

4. The center differential unit of a planetary gear type as claimed in claim 1, wherein said first sun gear, said second sun gear, said first pinion and said second pinion are helical gears, a thrust load generated at a meshing point of said first sun gear and said first pinion, and a thrust load generated at a meshing point of said second sun gear and said second pinion cause frictional force between said second sun gear and said carrier.

5. The center differential unit of a planetary gear type as claimed in claim 1, wherein said carbon/carbon composite has a bending strength in the range of 200 MPa to 1200 MPa, a compressive strength in the range of 100 MPa to 800 MPa, and an interlaminar shear strength in the range of 20 MPa to 600 MPa.

6. A center differential unit of a planetary gear type comprising:

a carrier;

a first sun gear for receiving an output from a transmission and positioned interiorly of said carrier;

a second sun gear provided on an output side with respect to said first sun gear and positioned interiorly of said carrier;

a first pinion meshing with said first sun gear;

a second pinion meshing with said second sun gear;

a pinion member carrying said first pinion and said second pinion therearound, said pinion member having a shaft-receiving hole;

a bearing made of carbon/carbon composite provided in said shaft-receiving hole; and a pinion shaft made of a steel material, said pinion shaft supported by said carrier at one end on the output side and directly supporting said pinion member so as to rotate by being inserted into said shaft-receiving hole.

7. The center differential unit of a planetary gear type as claimed in claim 6, wherein force resulting from a separation load and a tangential load generated at a meshing point of said first sun gear and said first pinion and a meshing point of said second sun gear and said second pinion is applied to said pinion shaft.

8. The center differential unit of the planetary gear type as claimed in claim 6, wherein said first sun gear, said second sun gear, said first pinion and said second pinion are helical gears, a thrust load generated at a meshing point of said first sun gear and said first pinion, and a thrust load generated at a meshing point of said second sun gear and said second pinion cause frictional force between said second sun gear and said carrier.

9. The center differential unit of a planetary gear type as claimed in claim 6, wherein said carbon/carbon composite has a bending strength in the range of 200 MPa to 1200 MPa, a compressive strength in the range of 100 MPa to 800 MPa, and an interlaminar shear strength in the range of 20 MPa to 600 MPa.

10. A planetary gear comprising:

a carrier;

a sun gear provided interiorly of said carrier;

a pinion meshing with said sun gear;

a pinion member carrying said pinion therearound, said pinion member having a shaft-receiving hole; and a pinion shaft having at least a surface of carbon/carbon composite, said pinion shaft supported by said carrier and directly supporting said pinion member so as to rotate by being inserted into said shaft-receiving hole of said pinion member.

11. The planetary gear as claimed in claim 10, wherein said pinion shaft is made entirely of carbon/carbon composite.

12. The planetary gear type as claimed in claim 10, wherein said carbon/carbon composite has a bending strength in the range of 200 MPa to 1200 MPa, a compressive strength in the range of 100 MPa to 800 MPa, and an interlaminar shear strength in the range of 20 MPa to 600 MPa.

13. A planetary gear comprising:

a carrier;

a sun gear provided interiorly of said carrier;

a pinion meshing with said sun gear;

a pinion member carrying said pinion therearound, said pinion member having a shaft-receiving hole;

a bearing made of carbon/carbon composite provided in said shaft-receiving hole; and a pinion shaft made of a steel material, said pinion shaft supported by said carrier and directly supporting said pinion member so as to rotate by being inserted into said shaft-receiving hole.

14. The planetary gear type as claimed in claim 13, wherein said carbon/carbon composite has a bending strength in the range of 200 MPa to 1200 MPa, a compressive strength in the range of 100 MPa to 800 MPa, and an interlaminar shear strength in the range of 20 MPa to 600 MPa.

* * * * *

UNITED STATES PATENT AND TRADEMARK OFFICE
CERTIFICATE OF CORRECTION

PATENT NO.    : 6,620,074 B2
DATED         : September 16, 2003
INVENTOR(S)   : Kanazawa et al.

It is certified that error appears in the above-identified patent and that said Letters Patent is hereby corrected as shown below:

Title page,
Item [73], Assignees, should read as follows -- Fuji Jukogyo Kabushiki Kaisha, Tokyo-To, Japan; Kikuchi Co., Ltd., Tokyo, Japan; and Across Co., Ltd., Saitama Pref., Japan. --.

Signed and Sealed this

Twenty-ninth Day of June, 2004

JON W. DUDAS
*Acting Director of the United States Patent and Trademark Office*